United States Patent [19]

de Mendoza Sans

[11] Patent Number: 4,936,198

[45] Date of Patent: Jun. 26, 1990

[54] SYSTEM FOR DECONTAMINATING A POLLUTED-AIR REGION

[76] Inventor: Juán F. de Mendoza Sans, Av. Diagonal, 466, 6° - 08006, Barcelona, Spain

[21] Appl. No.: 219,474

[22] Filed: Jul. 14, 1988

[30] Foreign Application Priority Data

Jul. 16, 1987 [ES] Spain .................................. 8702329

[51] Int. Cl.⁵ .......................................... F24F 7/007
[52] U.S. Cl. .......................................... 98/1; 239/14.1
[58] Field of Search ...................... 98/1, 33.1, 36, 39.1, 98/64, DIG. 1, DIG. 10; 239/14.1

[56] References Cited

U.S. PATENT DOCUMENTS

| | | | |
|---|---|---|---|
| 287,434 | 10/1883 | Hendry | 98/39.1 |
| 1,389,989 | 9/1921 | Ross | 98/1 X |
| 2,798,421 | 7/1957 | Hardesty | 98/39.1 X |
| 3,243,890 | 4/1966 | Easterday | 98/2.02 |

Primary Examiner—Harold Joyce
Attorney, Agent, or Firm—Michael J. Striker

[57] ABSTRACT

A system for reducing air pollution comprising a tower including an air intake at least 200 m above the ground, air outlets at more than 30 m above the ground, and a duct extending between the air take and the air outlets and having a flow cross-section of at least 25 m², and a blower located in the duct for drawing air through the air intake and expelling it from the outlets as jets moving at least 1 m/sec and extending at least 500 m from the outlet.

6 Claims, 1 Drawing Sheet

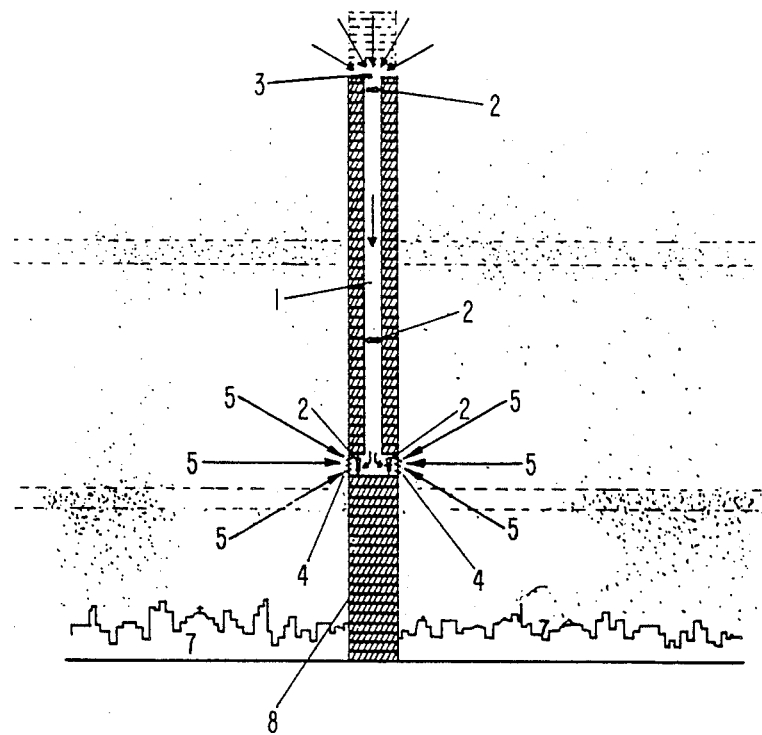

SYSTEM FOR DECONTAMINATING A POLLUTED-AIR REGION

This Patent of invention refers to an artificial breeze tower for the decontamination of areas of polluted atmosphere which constitutes a revolution among the methods known at present for the improvement of the city areas from the point of view of pollution.

Atmospheric pollution, above all in certain urban areas, is at present combatted by means of the control of the contaminating sources, but it cannot be totally eliminated, and in many occasions, especially in those periods in which thermal inversion phenomena take place, the concentration of pollutants close to the ground surface becomes very intense and stable in some areas and weather conditions.

It derives from the above that all methods used so far intend to reduce pollution by means of controlling the emission of contaminants, this bringing as a consequence some indirect problems when forcing to reduce the consumption of many materials that are indispensable for a better quality of life while at the same time being pollutants in themselves, or when forcing to procure costly facilities to purify and control the emissions.

The artificial breeze tower which is the object of this invention is intended to solve the problem of pollution from a totally different point of view, such as is the substitution of the polluted air by another pure one or by one with a much lower pollution level coming from the upper layers of the atmosphere.

In order to achieve this purpose it has been foreseen to build a very high tower or building to artificially convey the cleaner air of the upper layers to the lower ones through a duct work fitted to the said tower or building or incorporated in it, thereby reducing the concentration of the atmospheric pollution of the polluted areas, the said conveying being carried out by means of air driving or suctioning mechanisms such as airscrews, turbines or compressors.

By means of the invention claimed it is possible to greatly reduce the high concentrations of pollution through the combined action of deconcentration by dissolution and dispersion of the polluting elements in an unpolluted or at least less polluted mass of air, and also through the unstabilizing effect on the stratified layers when creating air draughts in them which as an artificial breeze produce a turbulent condition that favours the dispersion of the pollution.

The importance of the present invention is obvious when thinking that the atmospheric pollution takes place especially in densely populated urban areas related with a worldwide increasing population, affecting both the people's health and the cleanliness and maintenance of the cities.

The basic characteristic of the present invention consists in the intake of cleaner air situated in the higher areas above the main layers of thermal inversion, which are situated within the so-called planetary limit layer which is to be found up to a height situated between 300 and 500 meters from the ground surface.

On the basis of this, a tower is to be built whose height reaches or surpasses the high areas of the planetary limit layer and thus allows to take clean or less contaminated air from these areas and to drive it by forced circulation towards lower levels, to be expelled in such a way that it breaks the thermal inversion layers when projected against them, or else it creates a clean or less polluted surface layer when directly pumped to the ground.

It will be immediately understood that the device operates as an inverted chimney in which the air is conveyed downwards instead of upwards and is clean air instead of contaminated air or smoke.

The tower being the object of the claims can be built in such a way as to act only as a supporting element to support the elements necessary to forcibly convey the air, or it can even be on its turn a big habitable building also apt for several uses and having integrated in it or attached to it the said air driving device.

Both the shape of the tower and the conventional pumping elements needed to forcibly convey the air can be of different configuration without this affecting the essence of the invention.

In order to facilitate the explanation a sheet of drawings has been attached to this specification showing by way of illustrative and nonlimiting example an execution of an artificial breeze tower for the decontamination of areas of polluted atmosphere, as per the principles of the claims.

In the execution shown in the sheet of drawings the tower which is the object of the claims appears in a version in which the duct work is included in the tower, whereas in other cases it could be attached or superimposed to it.

DESCRIPTION OF THE DRAWING

The above and other objects, features, and advantages will become apparent from the following, reference being made to the accompanying drawing whose sole FIGURE is a largely schematic side view of the system of this invention.

SPECIFIC DESCRIPTION

As seen in the drawing an artificial air-circulation tower 8 for decontaminating an area of polluted air is formed as a building at least 200 m in height and formed with an internal air duct 1 having an upper inlet end 3 and a plurality of lower outlets 4, the latter being well above the tops of the adjacent buildings. Blowers 2 are provided in the duct 1, here in the outlets 4, to draw clean air in through the inlet 3 and to disperse it downward as jets 5 from the outlets 4. These jets 5 can be above the thermal inversion layer 6 or directed downward at the ground level 7.

Due to the height of the tower 8 it aspirates air from the high levels of the planetary limit layer where the air is substantially free of pollution. This clean air, when driven by the blowers 2 through the outlet ports 4 into the inversion layer 6 and toward the ground level 7 creates drafts that dilute, disperse, and reduce the pollution in the surrounding area.

Theoretical studies indicate that such a pollution-reducing tower can, dependent on the power of the blowers 2, maintain a very low pollution level in an area of 1 km to 3 km in radius so that it can be cost effective.

In the inventive system means can be provided at the outlets for directing the jets, such as for example vanes. Also, means can be provided for introducing powder or liquid into the air jets at the outlets. Acoustic silencers can further be arranged at the outlets. To the contrary means can be arranged at the outlets for providing sounds as the air jets pass. Finally, the inventive tower can be formed as a part of a habitable building.

The above does not limit the scope of the instant invention as defined in the following claims.

The following is being claimed as to the effects of the present patent of invention:

1. A system for reducing air pollution, the system comprising:
   a tower at least 200 m high above the ground, said tower having an upper air intake at at least 200 m above the ground, an air outlet at more than 30 m above the ground, and a duct formed between the intake and the outlets and having a flow cross-section of at least 25 m²; and
   blower means in the duct for drawing air in through the intake and expelling said air from the outlets as jets moving at at least 1 m/sec and extending at least 500 m from the outlets.

2. The system defined in claim 1, further comprising means including vanes at the outlets for directing the jets.

3. The system defined in claim 1, further comprising means for introducing powder or liquid into the air jets at the outlets.

4. The system defined in claim 1, further comprising acoustic silencers at the outlets.

5. The system defined in claim 6, further comprising means at the outlets for producing sounds as the air jets pass.

6. The system defined in claim 6 wherein the tower is part of a habitable building.

* * * * *